T. T. PROSSER.
Relief-Valve for Hose-Couplings.

No. 211,046.                   Patented Dec. 17, 1878.

Attest:
H W Anderson
Charles F. Holman

Inventor:
Treet T. Prosser

UNITED STATES PATENT OFFICE.

TREAT T. PROSSER, OF CHICAGO, ILLINOIS.

IMPROVEMENT IN RELIEF-VALVES FOR HOSE-COUPLINGS.

Specification forming part of Letters Patent No. 211,046, dated December 17, 1878; application filed September 9, 1878.

*To all whom it may concern:*

Be it known that I, TREAT T. PROSSER, of Chicago, in the county of Cook and State of Illinois, have invented certain Improvements in Relief-Valves for Hose-Couplings, of which the following is a specification, reference being had to the accompanying drawings, which form a part thereof.

My invention is designed as an improvement on a relief-valve patented by me June 29, 1875, No. 165,119. That valve was well arranged for certain purposes; but for use on hose for fire-engines the flow of the water against the spring caused an increased tension and a side action of the valves, so that they would not lift and close properly. These difficulties I have obviated by surrounding the water-passage with an annular chamber, with which the valves communicate, and in which my yokes and springs are so arranged as to operate freely, and not to interfere with the flow of water or with the operation of the valves.

Figure 1:
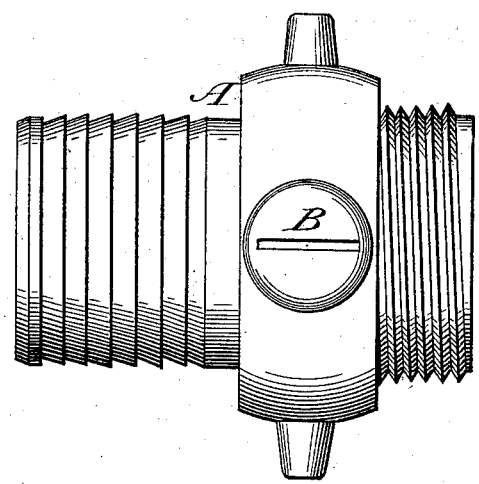
Figure 2:
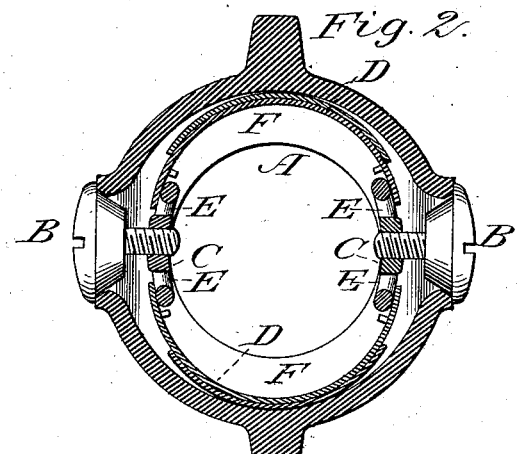
Figure 3:
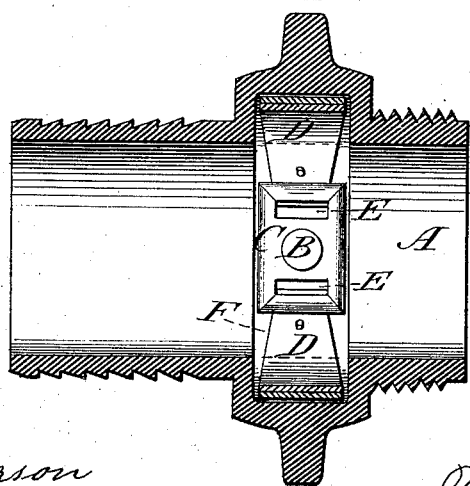

In the accompanying drawings, Figure 1 represents a side elevation; Fig. 2, a transverse section; Fig. 3, a longitudinal section.

The letters indicate the parts as follows: A, the coupling, Figs. 1, 2, and 3; B, the valves, Figs. 1, 2, and 3; C, the yokes, Figs. 2 and 3; D, the springs, Figs. 2 and 3; E, the openings in yokes, Figs. 2 and 3; and F, the annular chamber, Figs. 2 and 3.

The coupling A is constructed in the ordinary manner most in use by fire companies, with one end adapted to couple with a hose and the other end to couple with another coupling, with an enlarged center, in which are valve-seats, and within which is an annular chamber, surrounding the water-passage and connecting with it.

The valves B are constructed as shown in Fig. 2, and are fitted into their seats as shown in Figs. 1 and 2.

It will be seen that the valves B have a stem projecting inward, provided with a thread, and that they pass through the yokes, which are also threaded, so as to form nuts, and are slotted in the outer end, as shown at E.

The yokes C are constructed as shown in Figs. 2 and 3, and serve to connect the springs with the valves and to afford a ready means of adjustment by rotating the valves, so as to turn them out or in, thereby either increasing or lessening the tension.

The springs D are constructed of a thin plate or plates, as shown in Figs. 2 and 3, and are so arranged within the chamber and connected with the yokes, and through them to the valves, in such a manner as to form a complete arrangement for automatically operating the valves whenever the pressure of the water shall exceed the tension of the springs, and to automatically close when the tension of the springs exceed the pressure of the water.

The openings E are passages for the water through the yokes.

The object of this invention is to prevent the bursting of hose-pipes at fires from over-pressure.

Having thus described the construction and operation of my invention, what I claim as new, and desire to secure by Letters Patent, is—

1. In a hose-coupling for fire-engines, an annular chamber, formed by an abrupt and uniform enlargement of the water-passage through the coupling at a right angle to the flow of water through the coupling, thus forming a chamber to receive and control the mechanism for operating the valves in the coupling, when constructed in the manner shown and described.

2. In a hose-coupling for fire-engines, the combination of the yokes C C and springs D D for operating the valves, when constructed and operated as shown and described.

3. In a hose-coupling for fire-engines, the combination of the coupling A, the valves B B, the springs D D, and the yokes C C, when operated in the manner and for the purpose herein described.

In testimony whereof I have signed my name to this specification in the presence of two subscribing witnesses.

TREAT T. PROSSER.

Witnesses:
H. H. HONORÉ, Jr.,
HENRY WALLER, Jr.